United States Patent
Allen (10) Patent No.: US 10,066,568 B2
(45) Date of Patent: Sep. 4, 2018

(54) LEARNING AN INTAKE OXYGEN CONCENTRATION OF AN ENGINE

(71) Applicant: Robert Bosch GmbH, Stuttgart (DE)

(72) Inventor: Justin Allen, Clarkston, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/228,911

(22) Filed: Aug. 4, 2016

(65) Prior Publication Data

US 2018/0038305 A1    Feb. 8, 2018

(51) Int. Cl.
| | |
|---|---|
| *F02D 41/24* | (2006.01) |
| *F02D 13/02* | (2006.01) |
| *F02D 41/26* | (2006.01) |
| *F02D 41/18* | (2006.01) |
| *F02D 41/00* | (2006.01) |

(52) U.S. Cl.
CPC ..... *F02D 41/2441* (2013.01); *F02D 13/0203* (2013.01); *F02D 41/0007* (2013.01); *F02D 41/0077* (2013.01); *F02D 41/18* (2013.01); *F02D 41/26* (2013.01); *F02D 2041/0017* (2013.01); *F02D 2200/04* (2013.01)

(58) Field of Classification Search
CPC .. F02D 13/0203; F02D 41/00; F02D 41/0007; F02D 41/0052; F02D 41/0077; F02D 41/18; F02D 41/2441; F02D 41/26
USPC ......... 701/102–104, 106–109, 115; 123/672, 123/674, 699, 703
See application file for complete search history.

(56) References Cited

U.S. PATENT DOCUMENTS

| | | | | |
|---|---|---|---|---|
| 5,379,740 | A * | 1/1995 | Moore | F02D 19/0605 123/27 GE |
| 6,279,372 | B1 * | 8/2001 | Zhang | F02D 41/0005 204/401 |
| 8,499,752 | B2 * | 8/2013 | Bahlo | F02D 41/123 123/703 |
| 9,181,887 | B2 | 4/2015 | Surnilla et al. | |
| 2005/0139193 | A1 | 6/2005 | Kobayashi et al. | |
| 2006/0213490 | A1 | 9/2006 | Vigild et al. | |

(Continued)

OTHER PUBLICATIONS

"How Engine Brakes Work" Nov. 21, 2008. HowStuffWorks.com. <http://auto.howstuffworks.com/auto-parts/brakes/brake-types/engine-brakes.

(Continued)

*Primary Examiner* — John Kwon
*Assistant Examiner* — Johnny H Hoang
(74) *Attorney, Agent, or Firm* — Michael Best & Friedrich LLP (57) ABSTRACT

System and method for learning an intake oxygen concentration of an engine. In one embodiment, the system includes an intake oxygen sensor and an electronic control unit. The intake oxygen sensor is configured to measure an oxygen concentration of intake air and output a signal indicative of an intake oxygen concentration value. The electronic control unit is configured to receive the signal indicative of the intake oxygen concentration value, determine whether fuel is being injected into an engine, determine whether the engine is operating in an over-run condition, control a valve to sweep an air pressure of an intake path of the engine across a plurality of air pressures, and store information indicative of intake oxygen concentration values across the plurality of air pressures to learn the intake oxygen concentration of the engine.

16 Claims, 5 Drawing Sheets

(56) References Cited

U.S. PATENT DOCUMENTS

| | | |
|---|---|---|
| 2007/0169748 A1 | 7/2007 | Nakayama et al. |
| 2010/0179745 A1 | 7/2010 | Nakayama et al. |
| 2011/0014067 A1* | 1/2011 | Mayr ................. B60T 17/02 417/364 |
| 2012/0037134 A1 | 2/2012 | Jankovic et al. |
| 2012/0124995 A1* | 5/2012 | Springer ............. F01N 3/021 60/605.1 |
| 2013/0073187 A1* | 3/2013 | Koch ................ F02D 41/0007 701/104 |
| 2014/0090362 A1* | 4/2014 | Eckhoff ............. F01N 3/0821 60/274 |
| 2014/0123630 A1* | 5/2014 | Eckhoff ............. F01N 3/035 60/274 |
| 2014/0288804 A1* | 9/2014 | Pursifull ........... F02D 41/1454 701/104 |
| 2015/0101326 A1* | 4/2015 | Surnilla ............ F02D 41/0052 60/599 |
| 2015/0101327 A1 | 4/2015 | Clark et al. |
| 2015/0101328 A1 | 4/2015 | Surnilla et al. |
| 2015/0121864 A1 | 5/2015 | Surnilla et al. |
| 2015/0292424 A1 | 10/2015 | Surnilla et al. |
| 2016/0209081 A1* | 7/2016 | Mencel ................ F24J 3/006 |

OTHER PUBLICATIONS

C.J. Baker, "How an Exhaust Brake Works," Banks Power, Available Online as early as Oct. 2, 2008, <http://bankspower.com/techarticles/show/17-How-An-Exhaust-Brake-Works>.

* cited by examiner

LEARNING AN INTAKE OXYGEN CONCENTRATION OF AN ENGINE

STATEMENT REGARDING FEDERALLY SPONSORED RESEARCH

This invention was made with government support under DOE Cooperative Agreement No. DE-EE0003303 awarded by the U.S. Department of Energy. The U.S. government has certain rights in the invention, which are further defined in an Advance Waiver of Domestic and Foreign Invention Rights under DOE Cooperative Agreement No. DE-EE0003303; W(A)-2012-007, CH-1656.

BACKGROUND

Conventional oxygen sensors are positioned in the exhaust path of an engine to detect an oxygen concentration of the exhaust gases in the exhaust path. Conventional oxygen sensors may also be positioned downstream of the engine's turbocharger.

SUMMARY

Although conventional oxygen sensors are able to provide exhaust oxygen concentration values. In some cases, intake oxygen concentration values, and in particular, intake oxygen concentration values over a controlled range of pressures are desirable. For example, learning intake oxygen concentration values over a range of air pressures may be used in a closed loop control of an engine's air path, yielding higher accuracy of the engine control system and increased fuel efficiency. However, learning the intake oxygen concentration over the range of air pressures may be inaccurate when using an engine with an exhaust gas recirculation (EGR) system because of exhaust gas in the intake path of the engine. Thus, there is a need for learning an accurate intake oxygen concentration of an engine with an EGR system.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment provides a system for learning an intake oxygen concentration of an engine. The system includes an intake oxygen sensor and an electronic control unit. The intake oxygen sensor is configured to measure an oxygen concentration of intake air and output a signal indicative of an intake oxygen concentration value. The electronic control unit is communicatively connected to the intake oxygen sensor and is configured to receive the signal indicative of the intake oxygen concentration value, determine whether fuel is being injected into an engine, determine whether the engine is operating in an over-run condition based at least in part on a determination that the fuel is not being injected into the engine, responsive to determining that the engine is operating in the over-run condition, control a valve to sweep an air pressure of an intake path of the engine across a plurality of air pressures, and responsive to controlling the valve to sweep the air pressure of the intake path across the plurality of air pressures, store information indicative of intake oxygen concentration values across the plurality of air pressures to learn the intake oxygen concentration of the engine.

Another embodiment provides a method for learning an intake oxygen concentration of an engine. The method includes measuring, with an intake oxygen sensor, an oxygen concentration of intake air and outputting a signal indicative of an intake oxygen concentration value. The method also includes receiving, with an electronic control unit, the signal indicative of the intake oxygen concentration value, determining whether fuel is being injected into an engine, determining whether the engine is operating in an over-run condition based at least in part on a determination that the fuel is not being injected into the engine, responsive to determining that the engine is operating in the over-run condition, controlling, with the electronic control unit, a valve to sweep an air pressure of an intake path of the engine across a plurality of air pressures, and responsive to controlling, the valve to sweep the air pressure of the intake path across the plurality of air pressures, storing, with the electronic control unit, information indicative of intake oxygen concentration values across the plurality of air pressures to learn the intake oxygen concentration of the engine Other aspects and embodiments will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement various embodiments. In addition, it should be understood that embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the invention may be implemented in software (for example, stored on non-transitory computer-readable medium) executable with one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components described herein. Additionally, for purposes of description, the various "valves" and "actuators" described herein may collectively, separately, or some combination thereof, be generally referred to as a "valve." Additionally, in some embodiments, the valves described herein each include a corresponding actuator device that controls the mechanical position of the valve based on an electrical signal.

Figure 1:
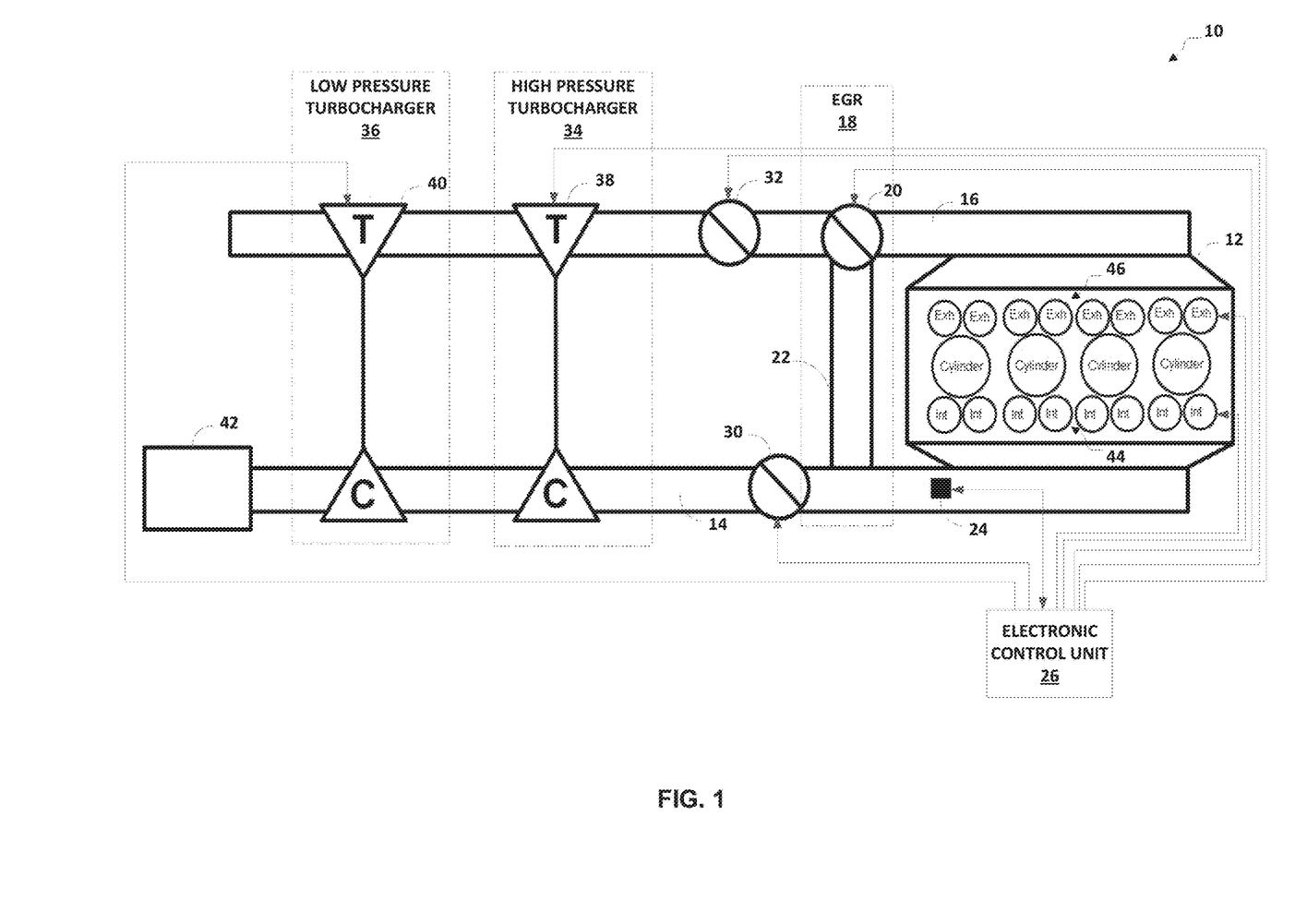
FIG. 1 is a diagram that illustrates a system including an engine, an exhaust gas recirculation (EGR) system, and an intake oxygen sensor.

FIG. 1 is a diagram of a system 10 including an engine, an exhaust gas recirculation (EGR) system, and an intake oxygen sensor. In the illustrated embodiment, the system 10 includes an engine 12, an intake path 14, an exhaust path 16, an exhaust gas recirculation (EGR) system 18, an intake oxygen sensor 24, an electronic control unit (ECU) 26, an intake throttle valve 30, an exhaust valve 32, a high pressure turbocharger 34, a low pressure turbocharger 36, and an air box 42. The EGR system 18 includes an exhaust gas recirculation (EGR) valve 20 and an exhaust gas recirculation (EGR) cooler 22. The high pressure turbocharger 34 includes a turbocharger control device 38. The low pressure turbocharger 36 includes a turbocharger control device 40. The engine 12 includes intake valves 44 and exhaust valves 46.

In the example illustrated, the system 10 utilizes the engine 12 in combination with the EGR system 18 and the intake oxygen sensor 24. The intake oxygen sensor 24 is positioned in the intake path 14 after exhaust gas recirculation mixing, for example, downstream from the EGR cooler 22. In some embodiments, the engine 12 is a compression ignition engine or a spark ignition engine. For example, the engine 12 may be a heavy duty diesel engine or a medium duty diesel engine.

The intake oxygen sensor 24 outputs a signal that is indicative of a measured oxygen concentration value in the intake path 14. The signal from intake oxygen sensor 24 is used by the ECU 26 in a closed loop control of the air path of the system 10, yielding higher accuracy in operating the engine 12. In some embodiments, the ECU 26 uses the signal from the intake oxygen sensor 24 to record a new oxygen concentration value across a range of different pressures. For example, the range of different pressures is 1 bar to 3.5 bars. The ECU 26 may use the new oxygen concentration value as a new reference value for air in the intake path 14 without exhaust gas from the EGR system 18. The ECU 26 also uses the signal from the intake oxygen sensor 24 to learn specific characteristics of the intake oxygen sensor 24. The ECU 26 uses the specific characteristics of the intake oxygen sensor 24 to counteract aging and sensor-to-sensor variability associated with the intake oxygen sensor 24 and adjust for variations in pumping current at different air pressures. In some embodiments, the intake oxygen sensor 24 is a nitrogen oxide sensor or other suitable device that can measure an oxygen concentration of intake air.

Figure 2:
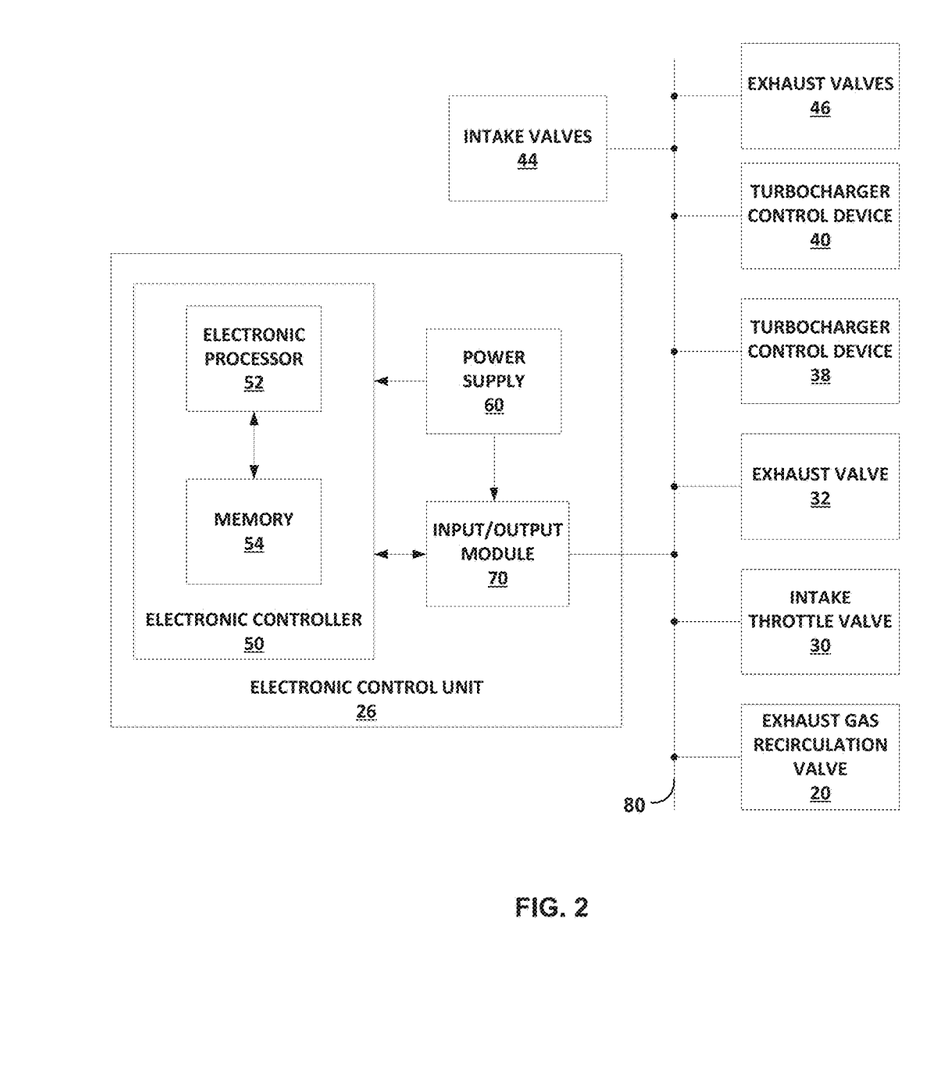
FIG. 2. is block diagram that illustrates an electronic control unit of FIG. 1

FIG. 2 is block diagram of the ECU 26 of FIG. 1. In the illustrated embodiment, the ECU 26 includes a plurality of electrical and electronic components that provide power, operation control, and protection to the components and modules within the ECU 26. For example, the ECU 26 includes, among other things, an electronic controller 50 (such as a programmable electronic microprocessor, microcontroller, or other suitable processing device), a power supply 60, and an input/output module 70.

The electronic controller 50 includes, among other things, an electronic processor 52 and a memory 54. The electronic processor 52 is communicatively coupled to the memory 54 and executes instructions which are capable of being stored in the memory 54. The electronic controller 50 is configured to retrieve from memory 54 and execute, among other things, instructions related to the control processes and method described herein. For example, The ECU 26 may apply the learned intake oxygen concentration of the engine 12 to closed loop engine control logic stored in the memory 54. In other embodiments, the ECU 26 includes additional, fewer, or different components. The ECU 26 may be implemented in several independent electronic control units each configured to perform specific functions listed herein. Additionally, the ECU 26 may contain sub-modules that input specific types of sensor data and perform related processes. For example, an intake oxygen concentration module of the ECU 26 may retrieve the recorded oxygen concentration values from the memory 54, determine a relationship of a pumping current of the intake oxygen sensor 24 across a range of different pressures in the intake path 14, and control the engine 12, other ECUs, or send data outputs based on the relationship of the pumping current of the intake oxygen sensor 24.

The ECU 26, the sub-modules, additional ECUs (for example, a fuel injector control unit), additional sensors (for example, an exhaust oxygen sensor), the intake oxygen sensor 24, the EGR valve 20, the intake throttle valve 30, the exhaust valve 32, the turbocharger control devices 38 and 40, the intake valves 44, and the exhaust valves 46 may be linked to the input/output module 70 via a communication bus 80. In some embodiments, the actuator devices included with the EGR valve 20, the intake throttle valve 30, the exhaust valve 32, the turbocharger control devices 38 and 40, the intake valves 44, and the exhaust valves 46 are linked to the input/output module 70 via the communication bus 80.

In the illustrated embodiment, the intake oxygen sensor 24 communicates the signal indicative of an intake oxygen concentration value with the input/output module 70 via the communication bus 80. In some embodiments, the communication bus 80 is a CAN bus. In other embodiments, the intake oxygen sensor 24 communicates with the input/output module 70 under other suitable protocols depending on the needs of the specific application (for example, a protocol such as J1939). In some embodiments, the input/output module 70 outputs information directly using dedicated signal lines.

Referring back to FIG. 1, the intake oxygen sensor 24 is subject to a range of air pressures in the intake path 14 that is larger than the range of air pressures that a conventional exhaust oxygen sensor is subjected to in the exhaust path 16. The relationship of a pumping current (for example, a sensor current) of the intake oxygen sensor 24 changes with the change in air pressure. Accordingly, the ECU 26 determines and monitors this relationship over different pressure ranges over the life of the application to ensure accuracy of the intake oxygen sensor 24.

The ECU 26 controls the EGR valve 20 to open or close. When the ECU 26 controls the EGR valve 20 to be open, exhaust gas from the engine 12 is recirculated via the EGR cooler 22 into the intake path 14. That is, the EGR system 18 causes the intake manifold air to include exhaust gas from the exhaust path 16 in addition to air from the air box 42. Accordingly, the ECU 26 performs the intake oxygen concentration learning when the EGR valve 20 is closed (for example, when the engine 12 is not producing torque). In some cases, when the ECU 26 controls the EGR valve 20 to be closed, there is still some leakage of exhaust gas past the EGR valve 20. The leakage of exhaust gas interferes with the learning of the oxygen concentration. To reduce the effect of exhaust gas interfering with the learning of the intake oxygen concentration of the intake air, the ECU 26 performs the oxygen concentration learning during an over-run condition of the engine 12 (for example, when there is no positive torque production of the engine 12).

Additionally, in some embodiments, the ECU 26 controls the intake valves 44 and the exhaust valves 46 to open or close using variable valve actuation. Using variable valve actuation, the ECU 26 may control the exhaust valves 46 to be late closing and/or the intake valves 44 to be late opening, which causes air pressures in the intake path 14 to sweep across a plurality of air pressures. In other embodiments, the ECU 26 controls a variable valve actuation device to control the opening or closing of the intake valves 44 and the exhaust valves 46.

Figure 3:
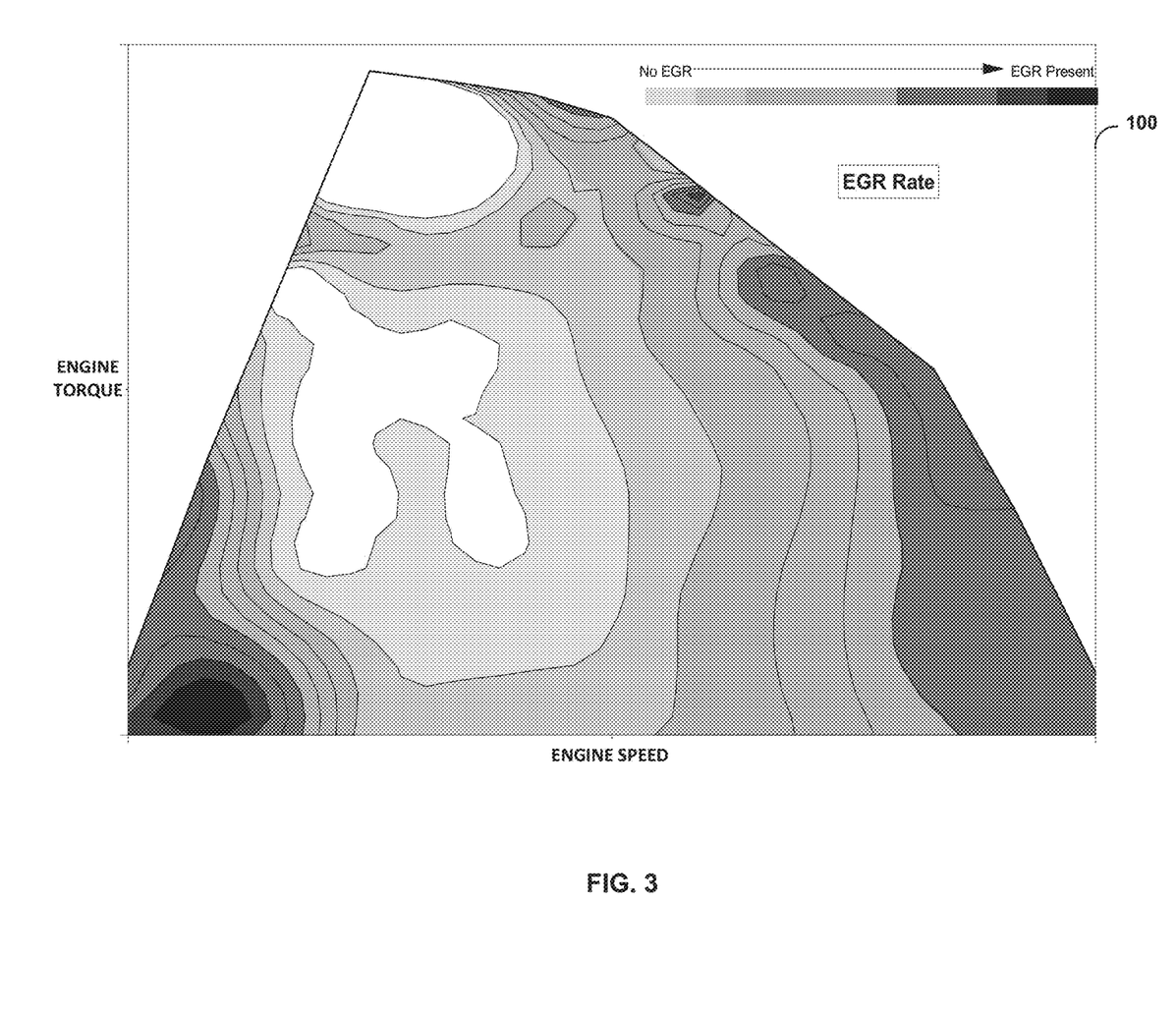
FIG. 3 is an engine map that illustrates a rate of exhaust gas recirculation (EGR) with respect to engine torque and engine speed in an engine with a closed exhaust gas recirculation (EGR) valve.

FIG. 3 is an engine map 100 that illustrates a rate of exhaust gas recirculation (EGR) with respect to engine torque and engine speed in an engine with a closed exhaust gas recirculation (EGR) valve. In some embodiments, up to eight percent of exhaust gas is present in an intake path of the engine when the EGR valve is closed.

Figure 4:
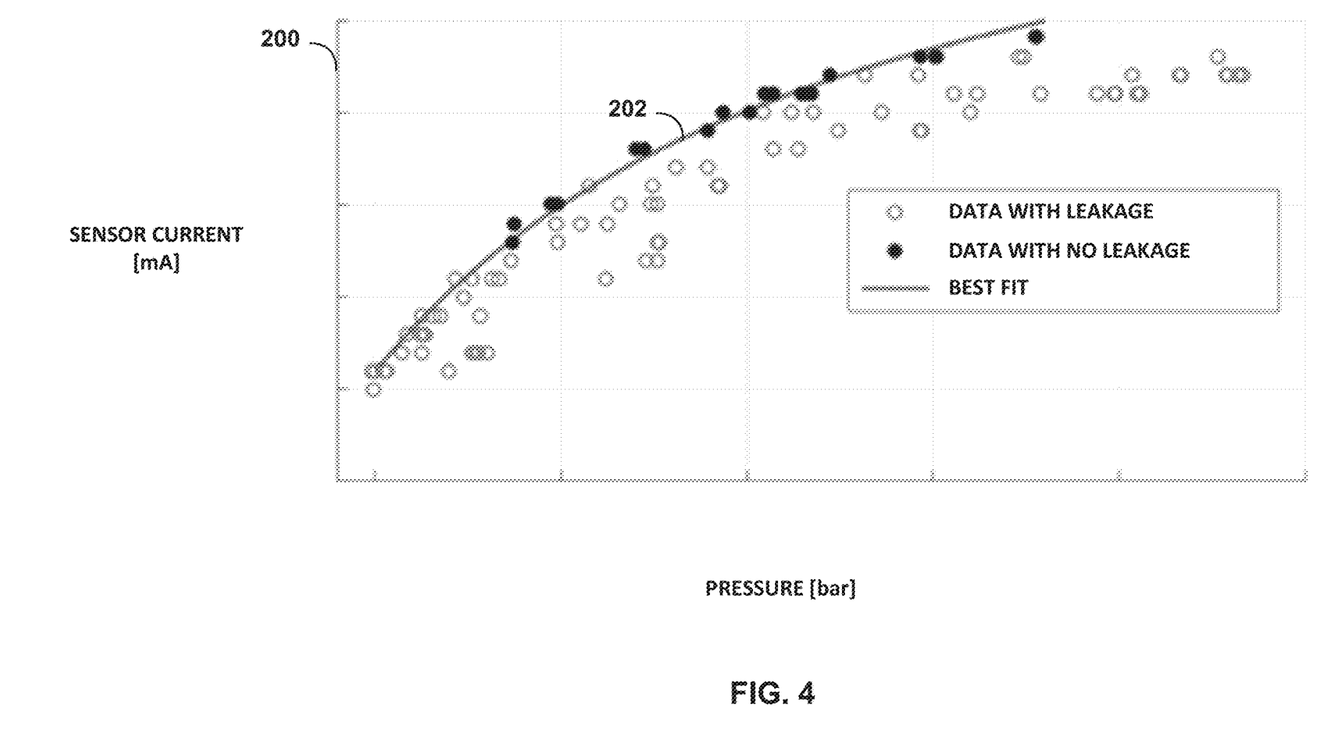
FIG. 4 is a chart that illustrates a sensor current over a range of pressures at an intake oxygen sensor in an engine with a closed exhaust gas recirculation (EGR) valve.

FIG. 4 is a chart 200 that illustrates a sensor current over a range of pressures at an intake oxygen sensor in an engine with a closed exhaust gas recirculation (EGR) valve. The filled points represent the pumping current of an intake oxygen sensor when there is no leakage from an exhaust gas recirculation (EGR) system. The unfilled points represent the pumping current of an intake oxygen sensor when there is leakage from the EGR system. The filled points closely fit a curve 202. In some embodiments, the filled points have a best fit k-value of 0.347. The unfilled points do not fit well to the curve 202 due to the interference of the leakage from the EGR system.

Figure 5:
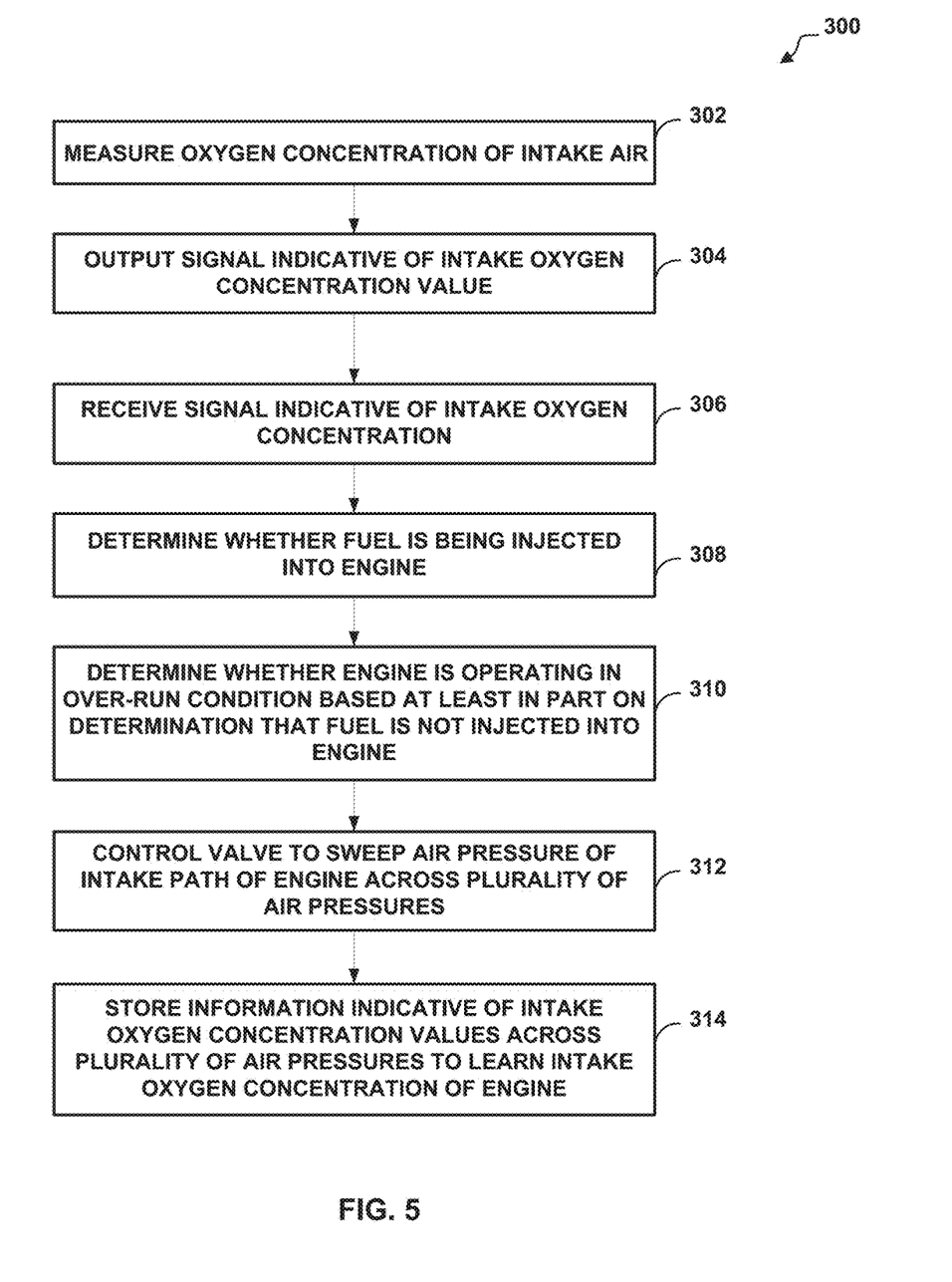
FIG. 5 is a flowchart that illustrates a method for learning an intake oxygen concentration of an engine.

FIG. 5 is a flowchart of a method 300 for learning an intake oxygen concentration of an engine. FIG. 5 is described with respect to the system 10 of FIG. 1. The ECU 26 uses the method 300 to learn the intake oxygen concentration over a lifetime of the engine 12 and during an over-run condition of the engine 12. The over-run condition is defined as the engine 12 spinning, and no fuel is injected into the engine 12. After a period of time, all combusted gases present in the system 10 will be pumped out past the EGR valve 20. In some embodiments, the period of time is at least two revolutions of the engine 12 after fuel is no longer injected into the engine 12.

During the over-run condition, the engine 12 becomes an air pump, and pumps air without exhaust gas through the intake path 14. In some embodiments, an over-run condition of the engine 12 may occur when a vehicle that includes the engine 12 is traveling downhill with no demand for fuel and is coasting.

The intake oxygen sensor 24 measures an oxygen concentration of intake air (block 302). The intake oxygen sensor 24 outputs a signal indicative of an intake oxygen concentration value (block 304). The ECU 26 receives the signal indicative of the intake oxygen concentration value (block 306).

The ECU 26 determines whether fuel is being injected into the engine 12 (block 308). For example, in some embodiments, the ECU 26 may determine whether fuel is being injected into the engine 12 based on an output from a fuel injector control unit or an exhaust oxygen sensor. In other embodiments, the ECU 26 may determine whether fuel is being injected into the engine 12 based on a signal from a fuel injector. In yet other embodiments, the ECU 26 determines an absence of a positive fuel set-point that comes from a torque path determined by the ECU 26. The torque path starts with a driver demand (for example, pedal position) and ends with the fuel set-point. Between the driver demand and the fuel set-point, the ECU 26 calculates driveline torque and losses.

The ECU 26 also determines whether the engine 12 is operating in the over-run condition based at least in part on a determination that the fuel is not injected into the engine 12 (block 310). Responsive to determining that the fuel is not injected into the engine 12, the ECU 26 controls a valve to sweep an air pressure of the intake path 14 of the engine 12 across a plurality of air pressures (block 312). Responsive to controlling the valve to sweep the air pressure of the intake path 14 of the engine 12 across the plurality of air pressures, the ECU 26 stores information indicative of intake oxygen concentration values across the plurality of air pressures to the learn an intake oxygen concentration of the engine 12 (block 314).

When the ECU 26 controls the valve to sweep the air pressure of the intake path 14 across the plurality of air pressures, the ECU 26 learns sensor characteristics of the intake oxygen sensor 24 at different intake pressures with the method 300. This learning by the ECU 26 ensures accuracy across the entire operation range of the engine 12. In some embodiments, the ECU 26 may learn the sensor characteristics by deriving or extrapolating a curve (for example, a curve similar to the curve 202 described above) from two or more intake oxygen concentration values at different pressures. The ECU 26 may use the extrapolated curve as a reference for oxygen concentration values of intake air across the plurality of air pressures at the intake oxygen sensor 24.

To sweep the air pressure of the intake path 14 across the plurality of air pressures, the ECU 26 may control the actuation of the intake throttle valve 30, one or both of turbocharger control devices 38 and 40, an exhaust brake mechanism, the EGR valve 20, the intake valves 44, and/or the exhaust valves 46 to change the air pressure in the intake path 14. For example, in some embodiments, to control the valve to sweep the air pressure of the intake path 14 of the engine 12 across the plurality of air pressures (block 312), the ECU 26 controls the actuation of the intake throttle valve 30.

In some embodiments, to control the valve to sweep the air pressure of the intake path 14 of the engine 12 across the plurality of air pressures (block 312), the ECU 26 controls the actuation of a turbocharger control device. For example, the turbocharger control device may be one of the turbocharger control devices 38 and 40 (for example, a waste gate, variable vane geometry, a nozzle, or other suitable turbocharger control device).

In some embodiments, to control the valve to sweep the air pressure of the intake path 14 of the engine 12 across the plurality of air pressures (block 312), the ECU 26 controls the actuation of an exhaust brake mechanism. For example, the exhaust brake mechanism is any device used to actuate the position of a valve placed in the exhaust path 16 to control a flow exhaust gas from the engine 12 (for example, the exhaust valve 32).

In some embodiments, to control the valve to sweep the air pressure of the intake path 14 of the engine 12 across the plurality of air pressures (block 312), the ECU 26 controls the actuation of the EGR valve 20. In other embodiments, to control the valve to sweep the air pressure of the intake path 14 of the engine 12 across the plurality of air pressures (block 312), the ECU 26 controls the intake valves 44 or the exhaust valves 46 (for example, the ECU 26 controls one or more of the exhaust valves 46 to as an exhaust compression valve).

In some embodiments, to control the valve to sweep the air pressure of the intake path 14 of the engine 12 across the plurality of air pressures (block 312), the ECU 26 controls the actuation of more than one of a group consisting of the intake throttle valve 30, one or both of the turbocharger control devices 38 and 40, the exhaust brake mechanism, the EGR valve 20, the intake valves 44, or the exhaust valves 46. In some embodiments, the actuation of more than one of the group described above includes simultaneous actuation with each other.

Additionally, in some embodiments, to control the valve to sweep the air pressure of the intake path 14 of the engine 12 across the plurality of air pressures (block 312), the ECU 26 controls a variable valve actuation device to control the intake valves 44 or the exhaust valves 46. For example, the variable valve actuation device is any device used to actuate the position of the intake valves 44 and/or the exhaust valves 46.

The ECU 26 may control the various actuators and valves of the system 10 during operation of the engine 12, and when the engine 12 is in the over-run condition, determine the intake oxygen concentration of the intake path 14 using the output of the intake oxygen sensor 24. The ECU 26 may also apply factors (for example, factors determined from learning the sensor characteristics) over the life of the intake oxygen sensor 24. Additionally, the ECU 26 may control the various actuators and valves of the system 10 to sweep quickly through several pressure set-points (for example, at least two pressure set-points) and over a short period of time (for example, at least two engine revolutions after fuel is not injected) using the method 300. In some embodiments, this allows the ECU 26 to quickly and correctly learn the pressure-based characteristics of the intake oxygen sensor 24 without influence from other sources of error that vary over longer period of time (for example, changing humidity, sensor aging, and other sources of error). For purposes of description, the various actuators and valves of the system 10 used to sweep through several pressure set-points using method 300 may collectively, separately, or some combination thereof, be generally referred to as a "valve." A valve is any device or system that directly or indirectly controls the flow of intake air through the intake path 14.

Various features and advantages of embodiments are set forth in the following claims.

What is claimed is:

1. A system for learning an intake oxygen concentration of an engine, the system comprising:
    an intake oxygen sensor configured to
        measure an oxygen concentration of intake air, and
        output a signal indicative of an intake oxygen concentration value; and
    an electronic control unit communicatively connected to the intake oxygen sensor and configured to
        receive the signal indicative of the intake oxygen concentration value,
        determine whether fuel is being injected into the engine,
        determine whether the engine is operating in an over-run condition based at least in part on a determination that the fuel is not being injected into the engine,
        responsive to determining that the engine is operating in the over-run condition, control a valve to sweep an air pressure of an intake path of the engine across a plurality of air pressures, and
        responsive to controlling the valve to sweep the air pressure of the intake path across the plurality of air pressures, store information indicative of intake oxygen concentration values across the plurality of air pressures to learn the intake oxygen concentration of the engine.

2. The system of claim 1, wherein the valve is an intake throttle valve, and wherein, to control the valve to sweep the air pressure of the intake path of the engine across the plurality of air pressures, the electronic control unit is further configured to control an actuation of the intake throttle valve.

3. The system of claim 1, wherein the valve is a turbocharger control device, wherein, to control the valve to sweep the air pressure of the intake path of the engine across the plurality of air pressures, the electronic control unit is further configured to control an actuation of the turbocharger control device.

4. The system of claim 3, wherein the turbocharger control device is one of a waste gate or variable geometry vanes.

5. The system of claim 1, wherein the valve is an exhaust brake mechanism, wherein, to control the valve to sweep the air pressure of the intake path of the engine across the plurality of air pressures, the electronic control unit is further configured to control an actuation of the exhaust brake mechanism.

6. The system of claim 5, wherein the exhaust brake mechanism is an exhaust valve positioned in an exhaust path of the engine to control flow of exhaust gases.

7. The system of claim 1, wherein the valve is an exhaust gas recirculation (EGR) valve, wherein, to control the valve to sweep the air pressure of the intake path of the engine across the plurality of air pressures, the electronic control unit is further configured to control an actuation of the EGR valve.

8. The system of claim 1, wherein the engine includes one or more intake valves and one or more exhaust valves, and wherein, to control the valve to sweep the air pressure of the intake path of the engine across the plurality of air pressures, the electronic control unit is further configured to control an actuation of the one or more intake valves or an actuation of the one or more exhaust valves.

9. The system of claim 1, further comprising:
    an intake throttle valve;
    a turbocharger control device;
    an exhaust brake mechanism; and
    an exhaust gas recirculation (EGR) valve,
    wherein the engine includes one or more intake valves and one or more exhaust valves, and
    wherein, to control the valve to sweep the air pressure of the intake path of the engine across the plurality of air pressures, the electronic control unit is further configured to control an actuation of more than one of a group consisting of:
        the intake throttle valve,
        the turbocharger control device,
        the exhaust brake mechanism,
        the EGR valve,
        the one or more intake valves, or
        the one or more exhaust valves.

10. A method for learning an intake oxygen concentration of an engine, the method comprising:

measuring, with an intake oxygen sensor, an oxygen concentration of intake air;

outputting, with the intake oxygen sensor, a signal indicative of an intake oxygen concentration value;

receiving, with an electronic control unit, the signal indicative of the intake oxygen concentration value;

determining, with the electronic control unit, whether fuel is being injected into the engine;

determining, with the electronic control unit, whether the engine is operating in an over-run condition based at least in part on a determination that the fuel is not being injected into the engine;

responsive to determining that the engine is operating in the over-run condition, controlling, with the electronic control unit, a valve to sweep an air pressure of an intake path of the engine across a plurality of air pressures; and responsive to controlling, the valve to sweep the air pressure of the intake path across the plurality of air pressures, storing, with the electronic control unit, information indicative of intake oxygen concentration values across the plurality of air pressures to learn the intake oxygen concentration of the engine.

11. The method of claim 10, wherein controlling the valve to sweep the air pressure of the intake path of the engine across the plurality of air pressures further includes controlling an actuation of an intake throttle valve.

12. The method of claim 10, wherein controlling the valve to sweep the air pressure of the intake path of the engine across the plurality of air pressures further includes controlling an actuation of a turbocharger control device.

13. The method of claim 10, wherein controlling the valve to sweep the air pressure of the intake path of the engine across the plurality of air pressures further includes controlling an actuation of an exhaust brake mechanism.

14. The method of claim 10, wherein controlling the valve to sweep the air pressure of the intake path of the engine across the plurality of air pressures further includes controlling an actuation of an exhaust gas recirculation (EGR) valve.

15. The method of claim 10, wherein controlling the valve to sweep the air pressure of the intake path of the engine across the plurality of air pressures further includes controlling an actuation of one or more intake valves of the engine or one or more exhaust valves of the engine.

16. The method of claim 10, wherein controlling the valve to sweep the air pressure of the intake path of the engine across the plurality of air pressures further includes controlling an actuation of more than one of a group consisting of:
- an intake throttle valve,
- a turbocharger control device,
- an exhaust brake mechanism,
- an exhaust gas recirculation (EGR) valve,
- one or more intake valves, or
- one or more exhaust valves.

* * * * *